M. B. SELLERS.
AERIAL NAVIGATION.
APPLICATION FILED APR. 28, 1909.

997,860.

Patented July 11, 1911.
6 SHEETS—SHEET 1.

WITNESSES

INVENTOR
MATTHEW B. SELLERS
BY
ATTORNEYS

M. B. SELLERS.
AERIAL NAVIGATION.
APPLICATION FILED APR. 28, 1909.

997,860.

Patented July 11, 1911
6 SHEETS—SHEET 4.

WITNESSES
E. M. Callaghan
Perry B. Turpin

INVENTOR
MATTHEW B. SELLERS
BY
ATTORNEYS

M. B. SELLERS.
AERIAL NAVIGATION.
APPLICATION FILED APR. 28, 1909.

997,860.

Patented July 11, 1911.
6 SHEETS—SHEET 6.

WITNESSES

INVENTOR
MATTHEW B. SELLERS
BY
ATTORNEY

UNITED STATES PATENT OFFICE.

MATTHEW B. SELLERS, OF BALTIMORE, MARYLAND.

AERIAL NAVIGATION.

997,860.  Specification of Letters Patent.  Patented July 11, 1911.

Application filed April 28, 1909. Serial No. 492,651.

*To all whom it may concern:*

Be it known that I, MATTHEW B. SELLERS, a citizen of the United States, and a resident of Baltimore, State of Maryland, have made certain new and useful Improvements in Aerial Navigation, of which the following is a specification.

This invention is an improvement in flying machines and particularly in that class of such machines illustrated in the Patent No. 927,289, dated July 6, 1909; and the present invention consists in certain novel constructions and combinations of parts as will be hereinafter described and claimed.

In the drawings
Fig. 2 is a side elevation thereof.
Fig. 3 is a detail view partly in section, of a yielding device.
Fig. 4 is a detail perspective view of a part of the same.

Figure 1:
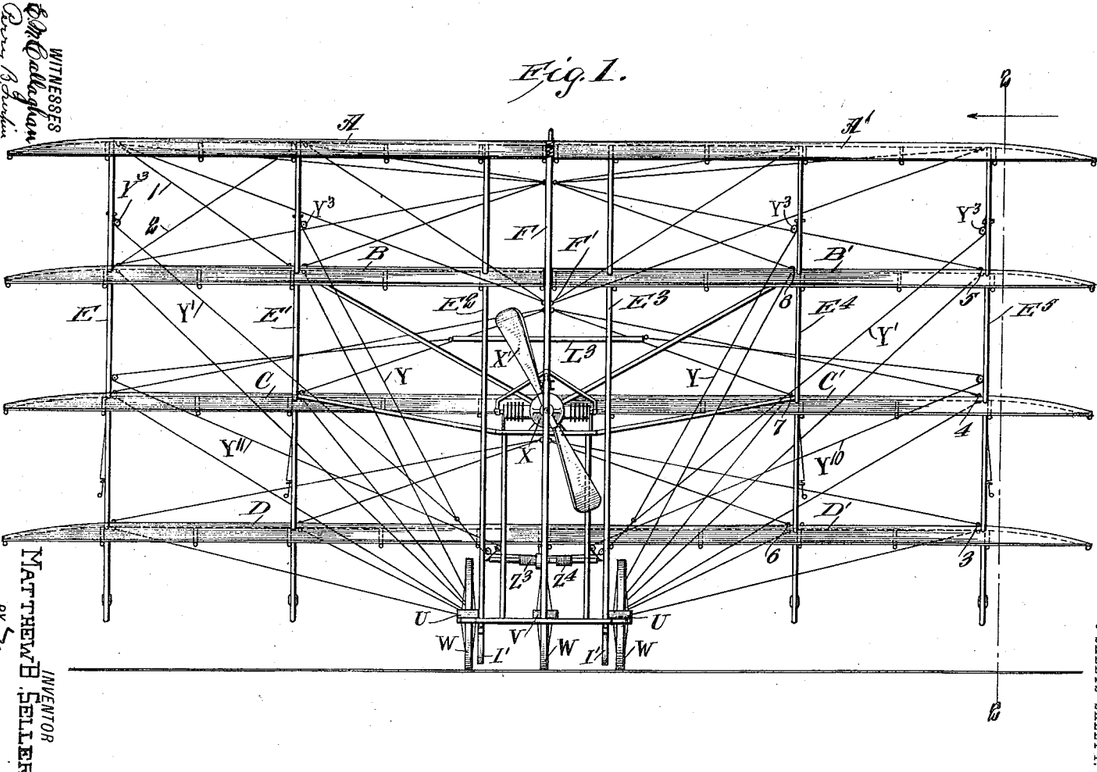
Figure 1 is a front elevation of my machine when used as a power machine.
Figure 11:
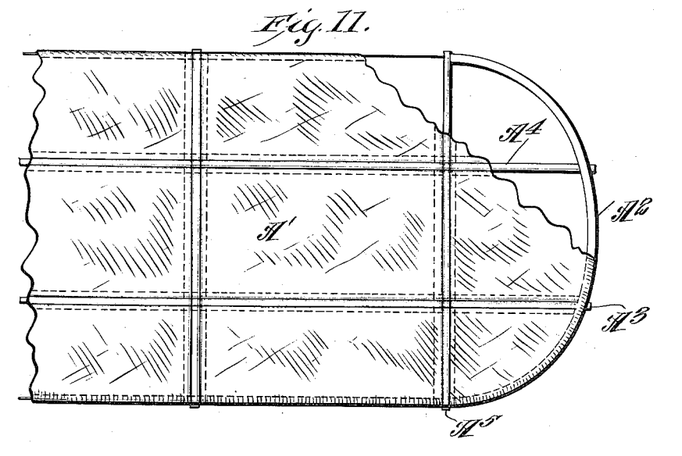
Fig. 11 is a detail of a part of one of the wings.

As in my previous above referred to application, I provide in the present apparatus four aeroplanes A, A', B, B', C, C', and D, D', arranged in stepped form with the highest aeroplane in the front and each of the aeroplanes comprising two so-called wings along side of each other, with the wings of each aeroplane joined together by suitable couplings at their meeting edges as best shown in Fig. 1 of the drawings. The several aeroplane wings are alike in construction and as shown in Fig. 11, are bowed at their outer ends at $A^2$ with the end bow suitably fastened to the spars $A^3$ and $A^4$, which extend longitudinally of the wings with the bow $A^2$ secured at its ends to the cross rod $A^5$ as best shown in Fig. 11 of the drawings. The wings are supported and braced by struts E, E', $E^2$, $E^3$, $E^4$ and $E^5$, extending transversely across the front edges of the wings and suitably fastened to the front spars of said wings where they cross the same, and the frame formed by the aeroplanes and the struts is braced throughout by diagonal tie wires as shown by wires 1 and 2, Fig. 1, of the drawings.

Figures 2, 3, 4:
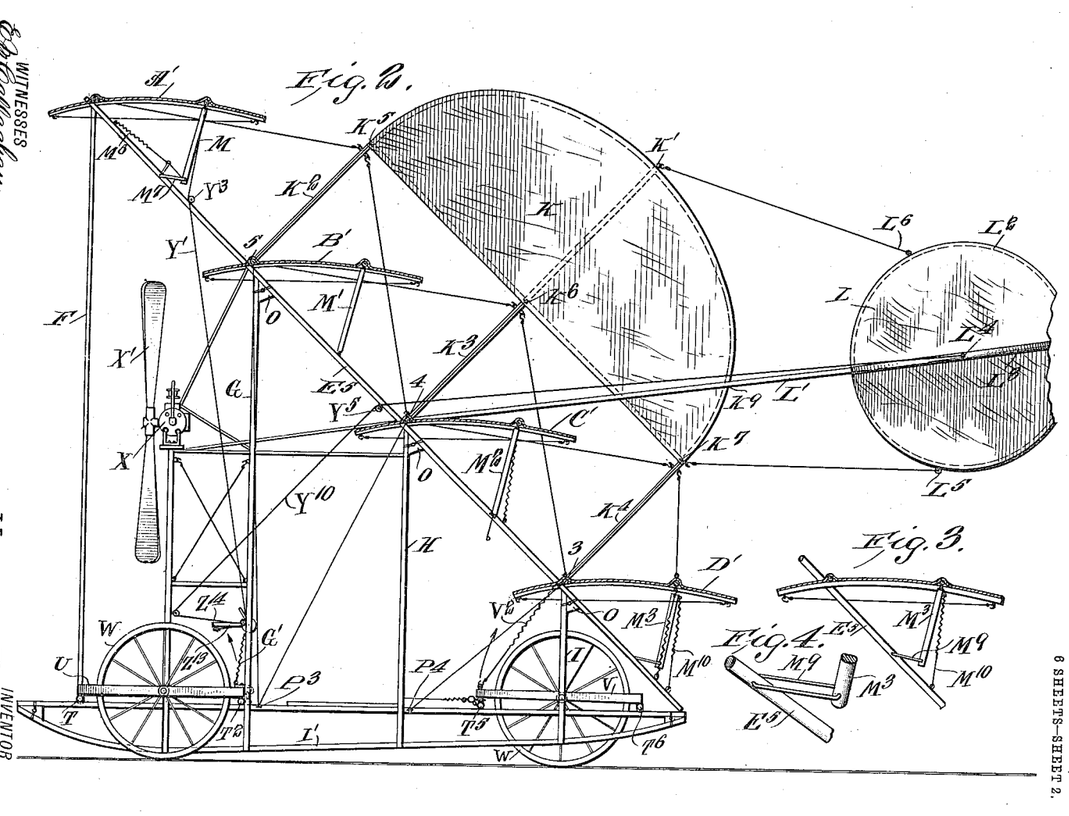

The aeroplane frame is supported from the chassis, see Fig. 2, by upright posts F, G, H and I, and the posts G, H and I are joined to their respective struts at their upper ends by the aid of triangular blocks O, see Fig. 2, and from suitable points $P^3$ and $P^4$ on the chassis, stay wires run to suitable points near the crossing of members 3, 4, 5, 6, 7 and 8, as will be understood from Figs. 1 and 2 of the drawings, and stay wires extend from a point F' on the post F laterally and upwardly to the top wings and brace the same as best shown in Fig. 1 of the drawings.

A fin K is supported on bars $K^2$, $K^3$ and $K^4$ extending upwardly and rearwardly from the center point of the front spars of the wings B, C, and D, and the fin has the bar $K^5$ $K^7$, and the bent rib over which cloth is stretched as shown. From the points $K^5$, $K^6$ and $K^7$ of the fin, stay wires lead to the frame as shown in Fig. 2 of the drawings. While this keel is preferred as it aids in steadying and balancing the machine, it manifestly may be omitted in some instances, and I do not desire to be limited to the use of the said keel or to any specified shape or size thereof.

A rudder L, see Fig. 2, is carried on a flexible rod L' detachably connected at its front end to the front spars of the aeroplanes C, C', and also at $K^9$, see Fig. 2, and this rod L' carries at its rear end the hoops $L^2$ and $L^3$ at a right angle to each other and over which cloth is stretched forming two disks one vertical and one nearly horizontal, the rudder being held in position by guy lines, extending from points $L^6$ to K' and $L^5$ to $K^7$, and it is not designed for the rudder to have any independent vertical movement but it is capable of a lateral movement by the bending of the rod L'.

Manifestly, any hinged connection may be used and any suitable form of rudder may be substituted for that shown and before described, but the rudder as shown may be preferred because of its simplicity and the ease with which it may be operated.

The chassis comprises the combination of a sled and wheels so arranged that when the aeroplane is acquiring its initial velocity it will run on the wheels and when it alights these wheels will be free to rise up out of the way allowing the machine to slide and come to rest on the runners. Means are provided for releasing the wheels and for holding the same above the plane of the runners, and obviously the wheels may be positively released or they may be automatically released in various ways as best suits the condition of launching, and I do not limit myself to any suitable method while preferring the construction as shown and hereinafter described.

The sled comprises the side bars P P' joined by the cross bars thereof T, T', T$^3$, T$^4$, T$^5$ and T$^6$, and runners I', carried from the side bars. Over a portion of the top frame of the sled a cloth R is stretched, see Fig. 5, and a suitable seat is provided for the operator.

Figure 5:
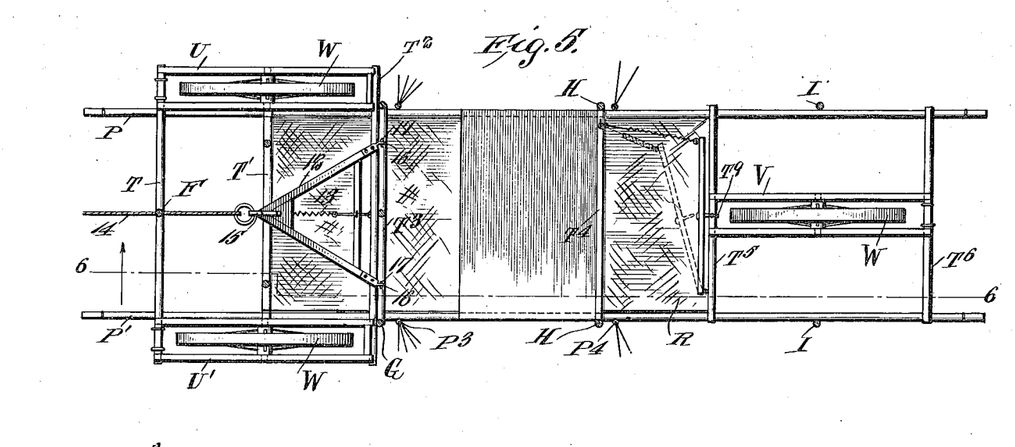
Fig. 5 is a top plan view of the chassis.
Figure 6:
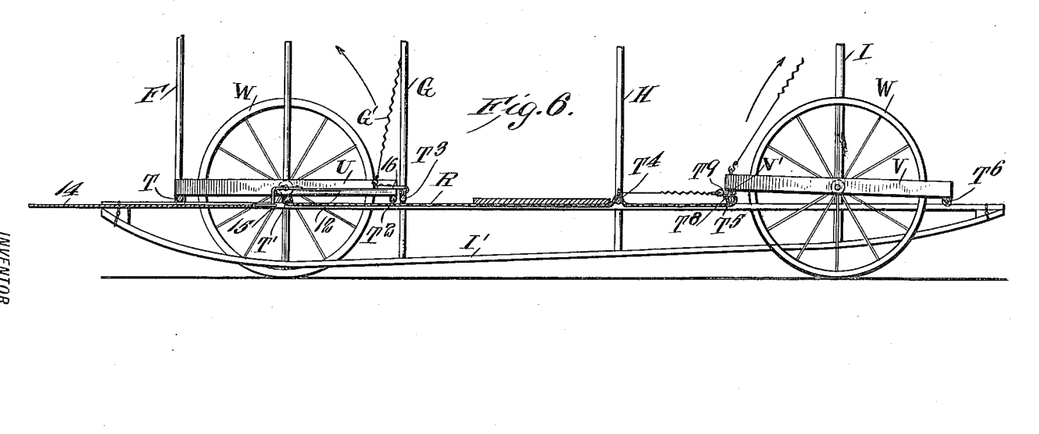
Fig. 6 is an elevation thereof, partly in section, showing the runners raised.
Figures 7, 8, 9, 10:
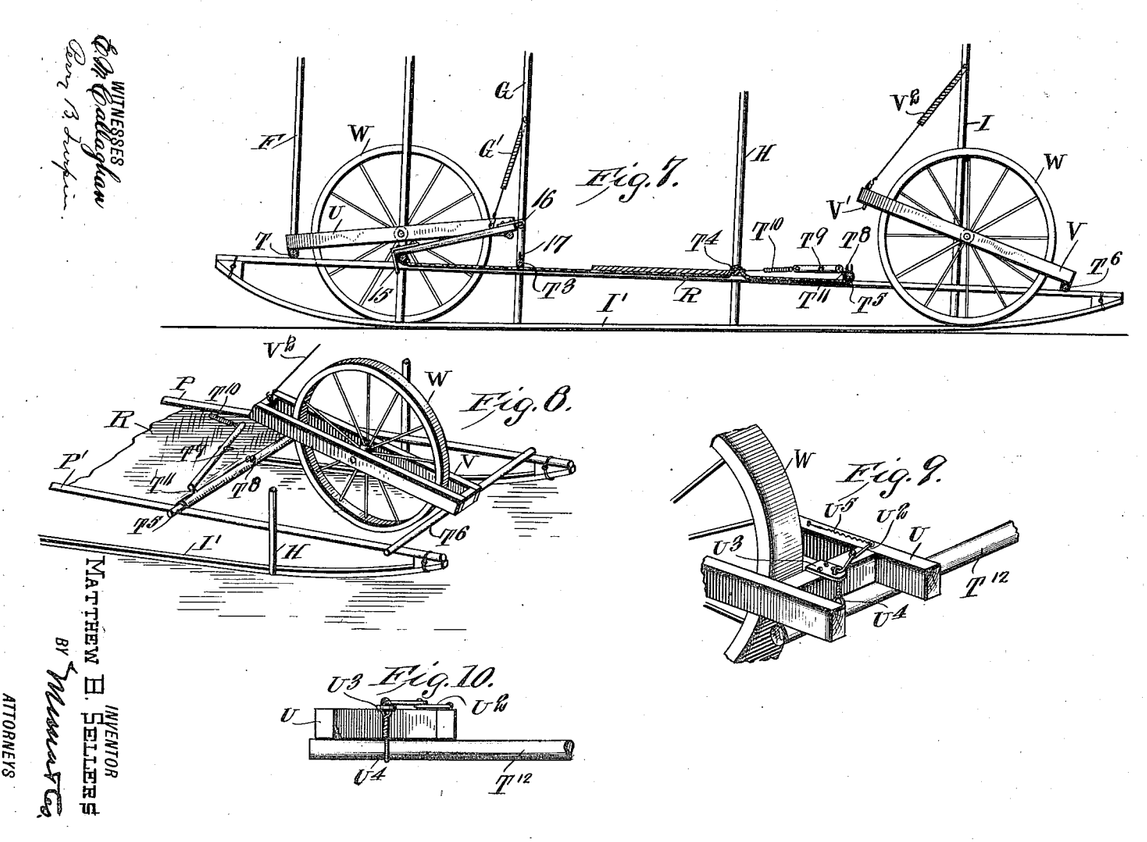
Fig. 7 is an elevation of the chassis showing the wheels raised.
Fig. 8 is a detail perspective view of the rear wheel mechanism.
Figs. 9 and 10 are detail views of the front wheel release mechanism.

The wheels W are provided at the front and rear of the machine. The front wheels being in pairs and the rear wheel being a single wheel, and separate frames U, U', and V being provided for the said wheels as best shown in Fig. 5. The front wheels W are carried in the frames U, U', and the rear wheel in the frame V, and when the machine is assisted in acquiring its initial velocity by tow line and dropping weight, the front wheels are arranged as shown in Figs. 5, 6 and 7, that is, the front wheel frame U is pivoted to the front cross bar T at its front end so it can rise and fall at its rear end, the side sections of the front frame being rigidly connected at their rear ends by a cross bar T$^2$, which can rise and fall relative to the sled frame, and means are provided for securing and releasing the rear end of the front wheel frame. As shown, this comprises a triangular draft frame 12, sliding back and forth on the cross bars T' and T$^3$ and drawn back normally by a spring 13, see Fig. 5, in which figure and in Fig. 6, the front wheels are in position for making the preliminary run with the aid of the towing line. The ring on the tow line 14 is slipped on the hook 15 at the front end of the draft frame 12, and the tension due to the pull of the towing weight prevents the ring from falling off, the hook opening downwardly as best shown in Fig. 6, and this tension on the draft frame also holds the said frame in its forward position with downwardly turned hooks 16 at its rear end in engagement with the staples or eyes 17 on the cross bar T$^3$ of the frame, the said draft frame 12 overlying the rear cross bar T$^2$ of the front wheel frame as shown in Figs. 5 and 6 of the drawings. Thus the bar T$^2$ and the wheel frame are held down in the position shown in Figs. 5 and 6, so the chassis will run on the wheels. When, however, the machine rises or the towing strain ceases the ring on the tow line 14 will drop off the hook 15, and the spring 13 will pull the frame 12 back withdrawing the hook 16 from the eyes 17 and releasing the wheel frame which will be drawn upwardly by the spring G', as shown in Figs. 6 and 7 to the position shown in Fig. 7, with the front wheels above the side runners.

The rear wheel V is pivoted at its rear end on the bar T$^6$, (which bar T$^6$, in practice, also rotates); and during the preliminary run of the machine the front end of the frame V is held down by the pin T$^9$, see Fig. 8, passing through registering loops T$^8$ on the cross bar T$^5$ and V' at the front end of the frame V, holding the wheel in the position shown in Fig. 6. The pin T$^9$ is carried about midway the ends of a lever arm which is pivoted at its end T$^{11}$ to the cross bar T$^5$ and has connected with its other end a spring T$^{10}$, which operates to withdraw the pin T$^9$ from the loops or eyes T$^8$ and V', but the spring is so adjusted that as long as the weight of the machine rests on the wheels the friction or pressure incident thereto will hold the pin within the registered loops T$^8$ and V$^{11}$, as shown in Fig. 6 of the drawings; but when the machine is supported in the air, this pressure of the loops on the pin is reduced and the tension of the spring T$^{10}$ will operate to withdraw the pin T$^9$ releasing the rear wheel frame which will be raised by the action of the spring at V$^2$, see Fig. 7, of the drawings. Manifestly, the rear wheel frame may be released when desired by pulling the lever arm carrying the pin T$^9$ by hand, and it will also be understood that two wheels may be used in the rear of the machine in place of one if so desired.

The described means for releasing the front wheel frame is designed for use when a tow line is employed. In Figs. 9 and 10 I illustrate a construction designed for use independent of a tow line, the principle of operation of the construction shown in Figs. 9 and 10 being substantially like that just described for releasing the rear wheel frame. In Figs. 9 and 10, the cross bar T$^{12}$ is fastened to the chassis frame and the wheel frame U is pivoted at its front end, and its rear end is held down against the cross bar T$^{12}$ by the releasing device. In this construction a loop or staple U$^4$ is supported from and above the bar T$^{12}$ and passes through a hole in a plate U$^3$ on the wheel frame, and a hook U$^2$ pivoted at its middle engages at one end in the loop and is actuated at its other end by a spring U$^5$. When the machine is resting on its wheels the pressure prevents the spring U$^5$ from withdrawing the hook; but when the machine is lifted from the ground the spring will withdraw the hook. A slight depression in the top of the hook forming a seat for the loop renders this operation more certain, see Fig. 9, of the drawings.

It is usually desirable when the ground surface is rough to employ a platform or run-way and to shorten the run by increasing the acceleration by means of the tow line actuated by the descending weight. In this case the end of the runway is preferably a few inches above the ground so that the machine will shoot out into the air in leaving the runway. When smooth ground is available the machine may be launched without a tow by making a longer run and it is preferable that the wings should strike the air at a very small angle during the preliminary run.

As best shown in Fig. 6, the rear wheel projects farther below the runners than the front wheels and when making the run on the ground the wings strike the air at a small angle and exert but little lift and resistance; and when the proper speed is attained the rear wheel may be positively released, causing the rear of the machine to drop, thus suddenly increasing the angle at which the wings strike the air and causing the machine to rise.

Figures 12, 13:
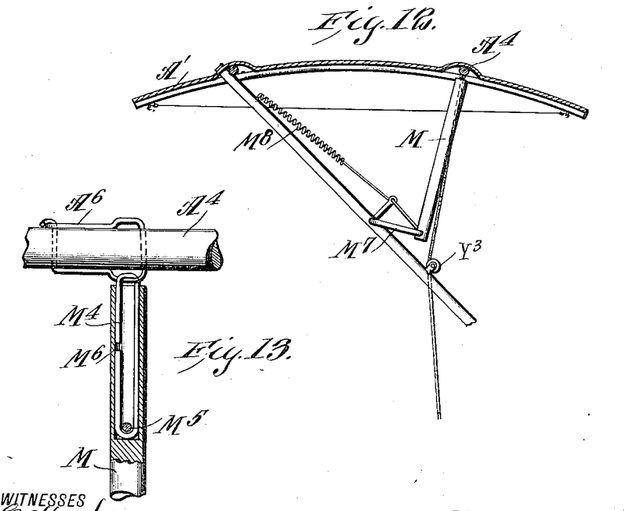
Figs. 12 and 13 are detail views partly in section, of the upper wing supporting mechanism.
Figure 14:
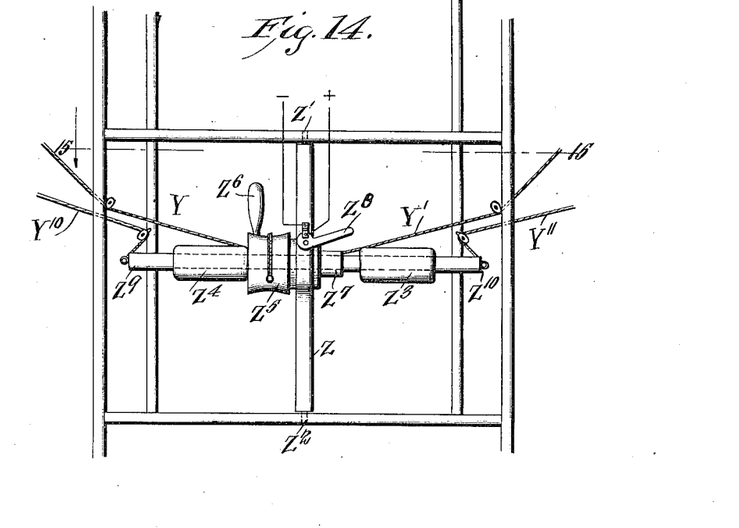
Figs. 14, 15 and 16 are detail views illustrating the steering devices.
Figure 15:
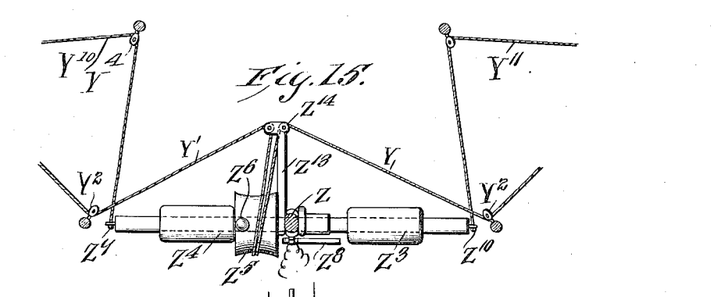
Figure 16:
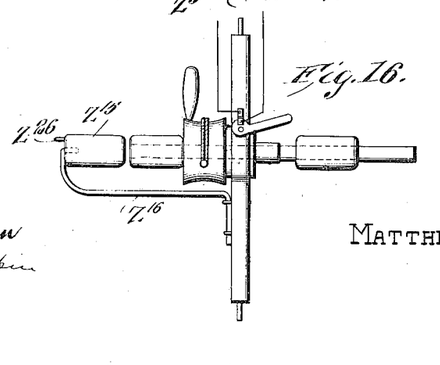

The steering gear is shown in detail in Figs. 14, 15 and 16 and comprises an upright or vertical post $Z$, journaled at its ends so it can turn. The central portion of this upright $Z$ is enlarged and carries a tube $Z^7$, preferably of brass, in which a horizontal steering bar $Z^9$ $Z^{10}$ is journaled so it may be turned. Grips $Z^3$ and $Z^4$ are also fast on the steering bar, and a drum $Z^5$ is fast on the steering bar, and a handle $Z^6$, is provided to assist in turning the drum. An engine switch $Z^8$ is carried by the upright bar so it can be conveniently moved by hand and as shown in Fig. 15, the forwardly projecting bar $Z^{13}$ extends from the upright or post $Z$ and carries at its front end pulleys $Z^{14}$ spaced apart for the steering cords $Y$, $Y'$ to the wings, which cords are fastened to the drum and pass over the pulleys $Z^{14}$ so that the drum may be turned to tighten or slacken the cords $Y$ $Y'$. The cord $Y$ passes over the pulleys $Y^2$ and $Y^3$ to points on the top wing at the two outer posts or props (M, Fig. 2). The cord $Y'$ has a similar course on the other side. It will be seen that by rotating the steering bar backward by means of the grips $Z^3$ and $Z^4$ the cords $Y$ and $Y'$ will be tightened and this will depress the rear of the top wings on both sides of the center. By turning the bar on the end pivots $Z'$, $Z^2$, this will move the arm $Z^{13}$ to one side or the other depressing one wing and allowing the other wing to rise. The steering or controlling cords are preferably connected to the points where the wings are supported by the props M, see Fig. 12, and where this is done, the props M as shown in said figure, are preferably used. The props comprise the rod M attached at its upper end to the spar $A^4$, preferably by means shown in Fig. 13, and connected at its lower end to the corresponding strut by the bell crank lever $M^7$ and the wing is held up by the operation of the spring $M^3$ through the bell crank lever, and the prop rod M, the elevated position of the prop rod being shown in Fig. 12. In connecting the prop rods M to the spars an open link $M^4$ is hooked on the staple $A^6$ on the spar, its center opening at $M^6$ permitting such operation after which the link $M^4$ is slipped endwise into the longitudinal bore in the end of the rod M to bring its opening $M^6$ below the upper end of said rod, and within its bore and the link is held in the rod by a cross pin $M^5$, as shown in Fig. 13. This construction is simple, economical and permits the convenient connection and disconnection of the parts by a construction of minimum weight. Manifestly, a support for the wing is not essential in all cases, but is found preferable for various reasons.

I have illustrated the wing control connecting at only four points on the top wings. I do not, however, limit myself to this as it is evident that any part of any wing may be so operated. The two central supports on the top wings, in the present construction are the balanced yielding devices described in my previous application before referred to, and when it is desired to also connect these points with the steering gear the cord $Y'$ will have three branches and the coupling joining the rear spars of the top wings may be omitted.

The rudder cords $Y^{10}$ and $Y^{11}$ may be attached to the eyes $Z^9$ and $Z^{10}$ at the ends of the steering bar, see Fig. 15, and they are actuated in conjuction with the wings as the turning of the handle on a pivot $Z'$ and $Z^2$ depresses one wing and simultaneously turns the rudder. However, where so desired the rudder cords may be attached to an independent lever as shown in Fig. 16, where $Z^{16}$ is a bent metal rod journaled on the upright post $Z$ and carrying the grip $Z^{15}$. In this construction the rudder cords are attached to the loop $Z^{26}$, one leading forwardly and the other to the rear and thence to the rudder in any convenient manner, one being attached to the rudder at the point $L^4$.

Where the positive control is not used the wings may be supported by a single prop M' or by a suitable yielding device, and in Figs. 3 and 4 I illustrate a simple form of yielding device in which the post $M^3$ is held and guided at its lower end by a swinging link $M^9$ and is normally held down in contact with the strut $E^5$ by the tension of a spring $M^{10}$ and yields upwardly when the pressure exceeds the tension of the spring.

In Fig. 2, I have illustrated an engine X and a propeller X' driven thereby.

While I have shown herein four planes in steps it will be understood that I do not limit myself to that number as fewer or more may be used if found necessary or desirable in the operation of the invention.

I claim—

1. An apparatus substantially as described comprising two or more aeroplanes arranged in stepped form, means supporting said aeroplanes at their front portions, yielding means supporting the rear edges of said aeroplanes and adapted to permit the same to be depressed at their rear edges, a rudder, a steering means, connections between said steering means and the rudder, connections between the steering means and the rear edges of the aeroplanes, substantially as set forth.

2. In an aerial apparatus, the combination of draft devices, a chassis comprising the combination of wheels and runners, means for holding the wheels in a relatively low position in starting including connections with the draft devices, means for automatically releasing the wheels after the machine has left the ground whereby they may be lifted, and means for lifting the wheels and holding the same elevated relatively to the runners.

3. In an aerial apparatus the combination of a chassis frame, runners for supporting the same, front and rear wheels adapted for adjustment to project below the runners, an aeroplane above the chassis, and automatically operated means for permitting the rear wheel to rise after the initial movement of the apparatus in starting, substantially as set forth.

4. The combination of an aeroplane, a chassis below the same and having runners, a front wheel frame pivoted to the chassis whereby it may be adjusted on said pivot to lower the wheel below the runners or raise said wheel above the runners, a tow line, and means whereby the tension on the tow line may hold said front wheel in lowered position, substantially as set forth.

5. The combination in an aerial apparatus with an aeroplane, and a chassis below the same, of a wheel for said chassis, a pivoted support carrying said wheel, and detent means for holding the wheel in lowered position and automatically releasing same when apparatus rises, substantially as set forth.

6. In an aerial apparatus the combination of a chassis, a wheel therefor, a pivoted frame carrying said wheel, and detent mechanism including a frictionally operating device for restraining the upward movement of said frame and adapted to automatically release the frame when the aeroplane rises, substantially as set forth.

7. In an aerial apparatus, the combination of a chassis frame, runners for supporting the same, wheels adapted for adjustment to project below the runners, an aeroplane above the chassis, and automatically operated means enabling the wheels to rise after leaving the ground in starting.

8. In an aerial apparatus, the combination of aeroplane devices, a chassis below and connected with said devices and provided with runners, wheels movably supported in connection with the chassis whereby they may be raised and lowered relatively to the runners, a tow line and means whereby tension on the tow line may hold the wheels in lowered position, substantially as set forth.

9. In an aerial apparatus, a chassis comprising a combination of wheels and runners, wheel frames pivoted at one end whereby they may be adjusted vertically at their other ends, means holding said ends depressed during the starting operation, and means for automatically releasing said ends whereby to permit the machine to alight on the runners, substantially as set forth.

10. A chassis for aeroplanes comprising wheels and runners, a towing hook, a releasing hook or hooks, means whereby the releasing hooks are held in engagement by the pull of the tow line, and means whereby the slacking of the tow line will release the wheel frame, substantially as set forth.

11. A chassis for aeroplanes having wheels and runners, a frame for one or more of the wheels, registering loops one of which is carried by said frame, a pin in said registered loops for holding the wheel frame, the said pin being adapted to be held in the registered loops by the pressure due to the weight of the machine, and a spring for withdrawing said pin when relieved of said weight, substantially as set forth.

12. An aeroplane steering device comprising an approximately horizontal handle bar adapted to rotate, a vertically pivoted post carrying said handle bar, a horizontal member projecting from said post and provided with guide pulleys, a drum on the handle bar wings or steering planes, a rudder, lines leading from the drum over said pulleys to control the wings or steering planes, and lines leading from the ends of the handle bar to control the rudder, substantially as described.

13. The combination of an aeroplane adapted to yield upwardly at its rear portion, a yielding support for said rear portion comprising a rod connected at its upper end with the aeroplane, a link pivotally connected with the lower end of and forming a swinging guide for said rod, and a spring controlling the upward movement of the rod, substantially as set forth.

14. A yielding support for an aeroplane or wing comprising a rod adapted at its upper end to said wings, a bell crank lever connected with the lower end of said rod, and a spring operating on the bell crank lever to elevate the rod and yieldingly support the aeroplane in an elevated position, substantially as set forth.

15. The combination of a spar, a staple on the spar, a post having a longitudinal bore at its upper end, an open link connected with the spar staple and having a side opening and fitted into the bore of the post with the side opening below the end of said post, and a cross pin through the post for holding the link in place, substantially as described.

16. A means for detachably connecting the end of a post to a spar or other member comprising a staple on the spar, a long link with an opening in its side for hooking into the staple, the post having an end bore to receive said link, and a pin for holding the link in place in the post, substantially as described.

17. In an aerial apparatus, the combination of a chassis, a wheel therefor, means holding the wheel in a relatively low position in starting, and means whereby the wheel will be automatically raised after leaving the ground.

18. The combination of an aeroplane, a chassis below the same and having runners and wheels automatically movable relatively to the runners, all substantially as described, whereby the wheels may be utilized in starting a flight and automatically lifted after leaving the ground and the runners be utilized in landing or finishing a flight.

MATTHEW B. SELLERS.

Witnesses:
N. E. McGINTY,
J. F. BISHOP.